(12) United States Patent
Blom et al.

(10) Patent No.: US 8,046,489 B2
(45) Date of Patent: Oct. 25, 2011

(54) SYSTEM AND METHOD FOR PROCESSING QUALITY-OF-SERVICE PARAMETERS IN A COMMUNICATION NETWORK

(75) Inventors: Marcus Anthonius Blom, Voorburg (NL); Frank Phillipson, Voorburg (NL)

(73) Assignee: Nederlandse Organisatie voor toegepast-natuurwetenschappelijk Onderzoek TNO, Delft (NL)

( * ) Notice: Subject to any disclaimer, the term of this patent is extended or adjusted under 35 U.S.C. 154(b) by 967 days.

(21) Appl. No.: 11/908,907

(22) PCT Filed: Mar. 17, 2006

(86) PCT No.: PCT/NL2006/000144
§ 371 (c)(1),
(2), (4) Date: Sep. 17, 2007

(87) PCT Pub. No.: WO2006/098622
PCT Pub. Date: Sep. 21, 2006

(65) Prior Publication Data
US 2009/0125631 A1    May 14, 2009

(30) Foreign Application Priority Data
Mar. 18, 2005   (EP) .................................... 05075658

(51) Int. Cl.
G06F 15/173    (2006.01)
(52) U.S. Cl. .......................... 709/238; 709/203; 709/240
(58) Field of Classification Search .................. 709/203, 709/238–242
See application file for complete search history.

(56) References Cited

U.S. PATENT DOCUMENTS

| 6,366,577 | B1 | 4/2002 | Donovan | |
|---|---|---|---|---|
| 6,748,433 | B1 * | 6/2004 | Yaakov | ........................ 709/224 |
| 6,847,613 | B2 * | 1/2005 | Mimura et al. ............... | 370/235 |
| 6,886,043 | B1 * | 4/2005 | Mauger et al. ................ | 709/238 |

(Continued)

FOREIGN PATENT DOCUMENTS
WO    WO 99/65183    12/1999
(Continued)

OTHER PUBLICATIONS

International Search Report of PCT/NL2006/000144, dated Mar. 7, 2006.
Written Opinion of the International Searching Authority of PCT/NL2006/000144.
ETSI, "Telecommunications and Internet Protocol Harmonization over Networks (TIPHON) Release 3; End to End Quality of Service in TIPHON systems; Part 2: Definition of speech Quality of Service (QoS) classes,"ETSITS 101 329-2:, Jan. 2002.

(Continued)

*Primary Examiner* — Phuoc Nguyen
(74) *Attorney, Agent, or Firm* — Leydig, Voit & Mayer, Ltd

(57) ABSTRACT

A system processes a communication session to be set up via a communication path from an originating location to a destination location through a network. A common Service Level Agreement (SLA) registry contains Quality-of-Service (QoS) related parameters representative of QoS valid for the domains between originating and destination locations. A QoS processor processes QoS related parameters retrieved from the SLA registry, for predicting the end-to-end QoS values for one communication path between originating and destination locations and for ranking or selecting or both ranking and selecting, based on predicted end-to-end QoS values, one or more recommended communication paths between the originating and destination locations. The QoS processor processes QoS parameters retrieved from the SLA registry and predicts end-to-end QoS values representative of all communication paths between network domains and for storing said predicted end-to-end QoS values in a QoS registry for selection and/or ranking actions for new session requests.

20 Claims, 2 Drawing Sheets

U.S. PATENT DOCUMENTS

| | | | |
|---|---|---|---|
| 6,910,074 B1 * | 6/2005 | Amin et al. .................... | 709/227 |
| 6,959,335 B1 * | 10/2005 | Hayball et al. ................ | 709/227 |
| 7,218,895 B1 * | 5/2007 | Raghavan .................. | 455/67.13 |
| 7,251,218 B2 * | 7/2007 | Jorgensen ..................... | 370/235 |
| 7,272,115 B2 * | 9/2007 | Maher et al. .................. | 370/253 |
| 7,319,691 B2 * | 1/2008 | Qing et al. .................... | 370/351 |
| 7,466,690 B2 * | 12/2008 | Schrodi ......................... | 370/352 |
| 2001/0021176 A1 | 9/2001 | Mimura et al. | |
| 2002/0152319 A1 * | 10/2002 | Amin et al. .................... | 709/232 |
| 2003/0217129 A1 | 11/2003 | Knittel et al. | |
| 2004/0215817 A1 * | 10/2004 | Qing et al. .................... | 709/238 |
| 2007/0288630 A1 * | 12/2007 | De Noia et al. ............... | 709/224 |

FOREIGN PATENT DOCUMENTS

| | | |
|---|---|---|
| WO | WO 02/05068 A2 | 1/2002 |
| WO | WO 02/06971 A1 | 1/2002 |
| WO | WO 03/084134 A1 | 10/2003 |

OTHER PUBLICATIONS

ETSI, "Telecommunications and Internet Protocol Harmonization Over Networks (TIPHON); Release 3; End to end Quality of Service in TIPHON Systems; Part 3: Signalling and control of end-to-end Quality of Service (QoS)," ETSI TS 101 329-3v212:, Jan. 2002.

ETSI, "Telecommunications and Internet Protocol Harmonization over Networks (TIPHON) Release 3; End to End Quality of Service in TIPHON systems; Part 2: Definition of speech Quality of Service (QoS) classes,"ETSITS 101 329-2:, Jul. 14, 2000.

ETSI, "Telecommunications and Internet Protocol Harmonization Over Networks (TIPHON); Release 3; End to end Quality of Service in TIPHON Systems; Part 3: Signalling and control of end-to-end Quality of Service (QoS)," ETSI TS 101 329-3v212:, Jul. 14, 2000.

* cited by examiner

SYSTEM AND METHOD FOR PROCESSING QUALITY-OF-SERVICE PARAMETERS IN A COMMUNICATION NETWORK

FIELD OF THE INVENTION

The invention refers to a system and method for processing a communication session between an originating location and a destination location.

BACKGROUND OF THE INVENTION

For initiating a communication session through a network, several cooperating individual (sub-)sessions, each through a domain (e.g. sub-network), may be needed. In a network depicted in FIG. 1, obviously, the end-to-end route of a session is not clear beforehand, nor is it clear at the originating domain if the session can be made with a required or desired Quality of Service (QoS). A session to be initiated may pass e.g. an origination local domain, an originating national domain, an international domain, a terminating national domain and a terminating local domain.

QoS signalling is known as such from e.g. references 1 and 2, disclosing several ways of performing QoS signalling. Yet QoS signalling implementations in global networks do not exist yet. The prior art methods have several shortcomings which will be outlined here by means of an example.

If a domain in e.g. the Netherlands (NL), shown in FIG. 1, receives a session request which originates in Amsterdam (ASD) and has Tokyo (TYO) as destination location, the controlling means of the NL domain has e.g. a choice between two international domains, e.g. AT&T and Sprint. On receiving the session request, the question for the NL domain is twofold, viz.

1. What next domain must be gone to (i.e. AT&T or Sprint in this example)?
2. Can the requested end-to-end QoS be obtained?

An answer to these questions may be based on the status of the NL domain, the Service Level Agreements (SLAs) between NL and AT&T, NL and Sprint, and the SLAs of both international domains with their respective Japanese domain(s).

Before continuing, a clear understanding may be needed of what is in an SLA and where an SLA resides in technical sense. Consider the structure of domains as given in FIG. 1. Three international domains A, B and C may be connected to domain JP. Traffic from each domain A, B and C arrives at domain JP at its own physical interface. Usually at this interface shaping, policing, SLA verification, access traffic handling, measurements (e.g. for billing) etc. are performed. These are important actions defined in an SLA. Then the traffic from the domains A, B and C is combined at a multiplexer and enters domain JP. Classification of traffic inbound domain JP, which is another important aspect of an SLA, may take place at the physical interfaces or at a multiplexer. Domain JP can now handle traffic according to its own classes as defined in its SLAs. At a higher level an SLA exists technically at an interface between two neighbouring domains.

To show what can be expected to be in an SLA, an example is considered of the contents of an SLA file.
A chapter describing the physical interface
A chapter describing the traffic classes
  which classes does the domains support?
  how are the classes implemented technically (syntax)?
  what is the meaning of each class (semantics)?
A chapter describing traffic handling per class
  measurement definition and timing
  amount of bandwidth reserved for a class
  QoS guarantees for traffic within a class bandwidth limit
  arrangements for handing access traffic
A financial chapter
  the cost for handling traffic per class
  the cost for handling access traffic per class Note that in theory, this can be defined differently for different ingress/egress combinations for the same domain. For instance, QoS guarantees from a NL Point of Presence (POP) of an international domain to Japan might be different than to Spain because of the different distance.

When a request for a session from ASD to TYO is received, an end-to-end "SLA calculator" might be used to compute the SLA from the various SLAs, e.g.
  SLA1=SLA(NL, A, B)+SLA(Sprint, B, JP)
  SLA2=SLA(NL, A, D)+SLA(AT&T, D, JP), etc.
where SLA(X,Y,Z) is a notation for SLA information provided by domain X for traffic entering it from domain Y and leaving it to domain Z.

However, this may violate the "requirement" that no new protocol should be needed for end-to-end QoS signalling of a session. Besides, a substantial drawback is that the SLA calculator would have to be invoked for each session by each domain, which results in a large overhead at each session setup. Finally, commercial SLA information should be kept confidential. However, if SLA information is exchanged between various domains, each individual SLA may be reverse-engineered, which may be unacceptable for the domain providers which, after all, are in mutual commercial competition.

REFERENCES

[1] ETSI TS 101 329-2: "Telecommunications and Internet Protocol Harmonization over Networks (TIPHON); End to End Quality of Service in TIPHON Systems; Part2: Definition of QoS Classes".
[2] ETSI TS 101 329-3v212: "Telecommunications and Internet Protocol Harmonization over Networks (TIPHON); End to End Quality of Service in TIPHON Systems; Part3: Signalling and control of end-to-end Quality of Service (QoS)";

SUMMARY OF THE INVENTION

The novel system presented below, aims to meet the prior art's shortcomings, considering that:
  Domain owners should be able to make their own decisions
  No new protocol should be needed for end-to-end QoS signalling of a session
  The solution should be scalable
  Commercial Service Level Agreement (SLA) information must be kept confidential To that end a novel system is proposed here for processing a communication session to be set up via a communication path from an originating location to a destination location through a communication network comprising a plurality of network domains. The novel system comprises a (common) Service Level Agreement (SLA) registry, containing Quality-of-Service (QoS) related parameters which are representative for the QoS valid for the relevant domains between the originating location and the destination location.

The novel system moreover comprises a QoS processor which is adapted for processing QoS related parameters which are retrieved from the SLA registry and for predicting—based on those retrieved parameters—an end-to-end QoS value which is representative for the communication path between the originating location and the destination location. As in many cases there will be (a plurality of) alternative communication paths between the originating location and the destination location, the Quality-of-Service (QoS) processor is adapted for predicting a plurality of end-to-end QoS values, each being representative for one communication path between the originating location and the destination location. Moreover, the QoS processor is adapted for ranking or selecting or both ranking and selecting, based on said a plurality of predicted (computed) end-to-end QoS values, one or more communication paths between the originating location and the destination location, having an optimal ("the best") predicted QoS value.

So, in short, the QoS processor calculates (predicts) the end-to-end QoS value of the paths between the originating and destination location, based on the SLA information as stored in the (common) SLA registry and ranks the relevant paths end-to-end QoS value order or, alternatively, selects the path having the best end-to-end QoS prediction.

As an alternative, the Quality-of-Service (QoS) processor is adapted for processing QoS related parameters, retrieved from the SLA registry, and predicting end-to-end QoS values which are representative for one or more communication paths between each network domain to each other network domain, the QoS processor moreover being adapted for storing said predicted end-to-end QoS values in a QoS registry. In this alternative configuration the end-to-end QoS values are not computed at the start of a new session between an originating and destination location, but the end-to-end QoS values of various communication paths are computed and stored in a QoS registry (which e.g. may be part of the SLA registry) in advance. As soon as a new session is applied for, the QoS processor ranks (and/or selects), based on said predicted end-to-end QoS values stored in the QoS registry, one or more communication paths between the originating location and the destination location, having the best end-to-end QoS value.

As the predicted end-to-end QoS values of various communication paths are computed in advance (e.g. during periods in which the network or the relevant network domains are not heavily loaded) and stored in a QoS registry, the ranking/selection process of recommended paths through the network for each new session may take less time compared with the previously proposed process. Re-computation of the end-to-end QoS predictions for some paths may be needed only when a domain's SLA changes which, however, will not happen very often.

An important aspect of the novel system is that there is no need for any new protocol. The system may use regular options of the existing signalling protocol (SIP/SDP) for the exchange of SLA related QoS data.

Yet another aspect is that the SLA information will be kept confidential as the SLA registry does not use (exchange) the SLA information itself, so reverse engineering will be excluded.

In the working example discussed before, the NL domain could request a route with an end-to-end QoS value of e.g. at least 3.5 (where a higher value is better), and the QoS processor would answer: "routing via AT&T results in a predicted QoS value of at least 3; routing via Sprint results in a QoS value of at least 3.5". Using this ranking information, the NL domain can make its own decision, based on the ranking given by the QoS processor (Sprint: 3.5; AT&T: 3), and, moreover, on information about its local status (e.g. its local load etc.). In this way, based on en-to-end QoS information, derived from the SLA registry and processed by the QoS processor resulting in one or more recommended and ranked "next to go" domains, as well as based on the relevant domain's local situation (load, costs, priorities etc.) each domain will be able to make its own choice as to which domain the requested session has to be routed to or e.g. if a requested session must be rejected because the requested QoS cannot be delivered.

The reason for letting the QoS processor generate a list of options instead of prescribing the "next to go" domain is that the QoS processor only calculates long-term (end-to-end) predictions without taking in account the dynamics of the current status of each individual domain. If a domain should not take into account its current status but would always use the first option given by the QoS processor, all new sessions would go to the same next domain, thus overloading the session (path) to that next domain. Using e.g. measurements, a domain may at some point decide that all new sessions should now go to the second (or third etc.) option given by the QoS processor. If all ranked options given by the QoS processor are considered unfeasible e.g. due to current traffic, a domain even may refuse the requested new session. A domain may also refuse a new session if the QoS processor does not give any options satisfying the (minimum) end-to-end QoS requirements. Alternatively, the originating domain could suggest to (negotiate with) the end-user to agree with a lower QoS and start the QoS signalling from scratch. This gives a domain maximum freedom to decide using all technical, QoS and commercial considerations.

In the working example, depicted in FIG. 1, the NL domain will choose to forward the session request to the Sprint domain, because the SLA registry or the QoS processor predicts that the QoS requirement can be met, and because of considerations that are internal to the NL domain (e.g., current traffic, costs, etc.).

It is noted that the proposed SLA registry and/or QoS processor may be implemented in a distributed way, e.g. for scalability.

It is noted that WO02/05068 discloses a system that provides end-to-end (ETE) quality of service (QoS) for voice and other real time applications in a Softswitch-based network, and more particularly, in a packet data network or IP network that is capable of setting up and routing voice calls through Softswitch. The soft switch system comprises a call agent that sets up and routes the calls. A universal quality of service manager (UQM) is formed to work with the call agent and the gateways and routers of the IP network to provision, control, and guarantee the ETE QoS for voice and other real time applications. The UQM consists of five components: Bandwidth Manager, Policy Engine, Real Time Performance Monitor, Admission Controller, and Bandwith Broker. With different levels of interactions between the above five components, the QoS for voice and other real time applications can be achieved by QoS provisioning, QoS controlling, and an ETE QoS guarantee. The prior art system, however, does neither address a system for processing a communication session to be set up via a communication path to be selected from alternative paths through several network domains, nor the use of a Service Level Agreement (SLA) registry, containing QoS related parameters which are representative for the separate domains and a Quality-of-Service (QoS) processor for predicting, ranking or selecting or both ranking and selecting, based on predicted end-to-end QoS values, communication paths having an optimal end-to-end QoS value.

DETAILED DESCRIPTION OF THE DRAWINGS

Figure 1:
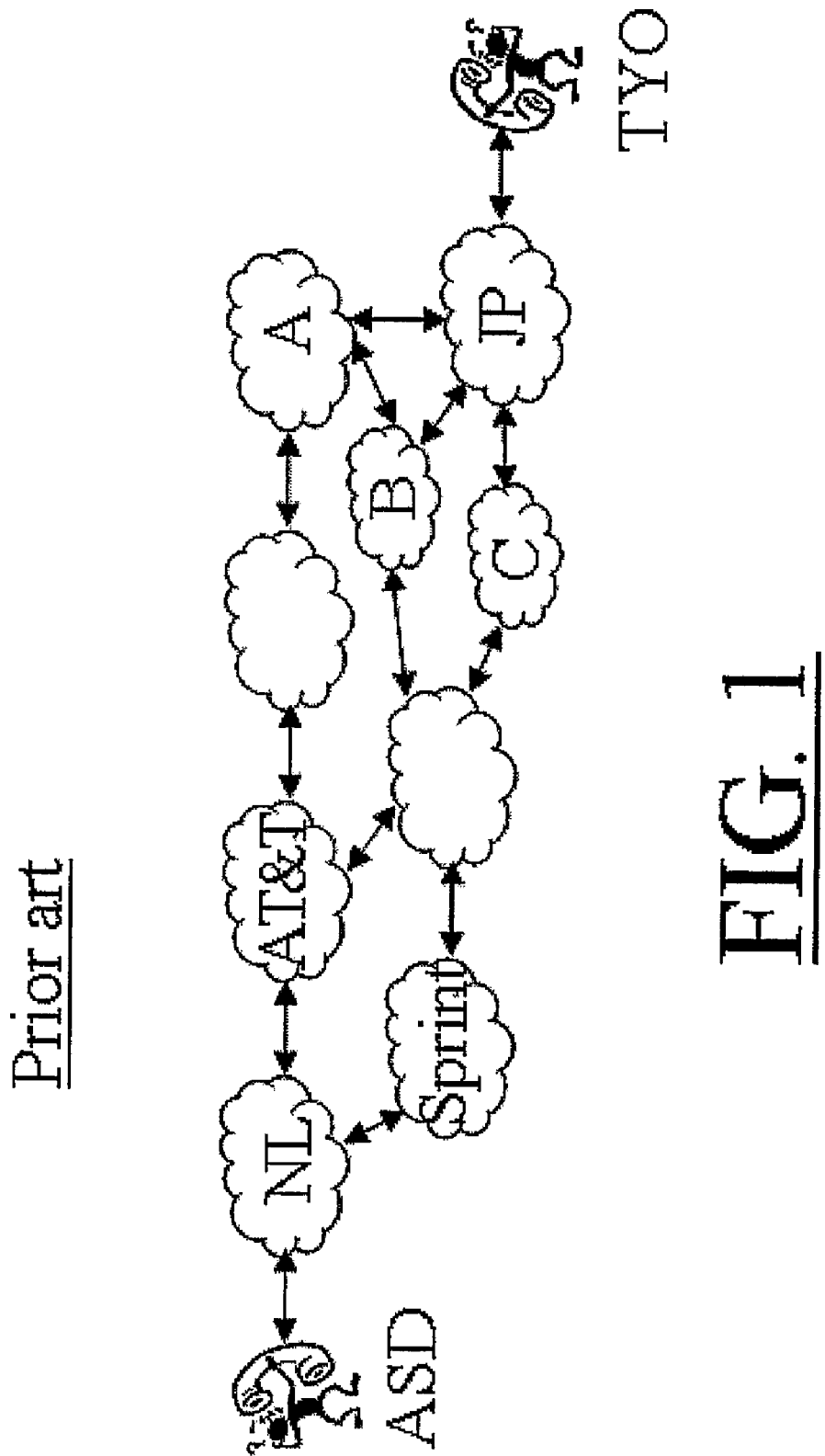
FIG. 1 shows a prior art communication network, comprising several domains.

The prior art system depicted in FIG. 1 has already been discussed before.

Figure 2:
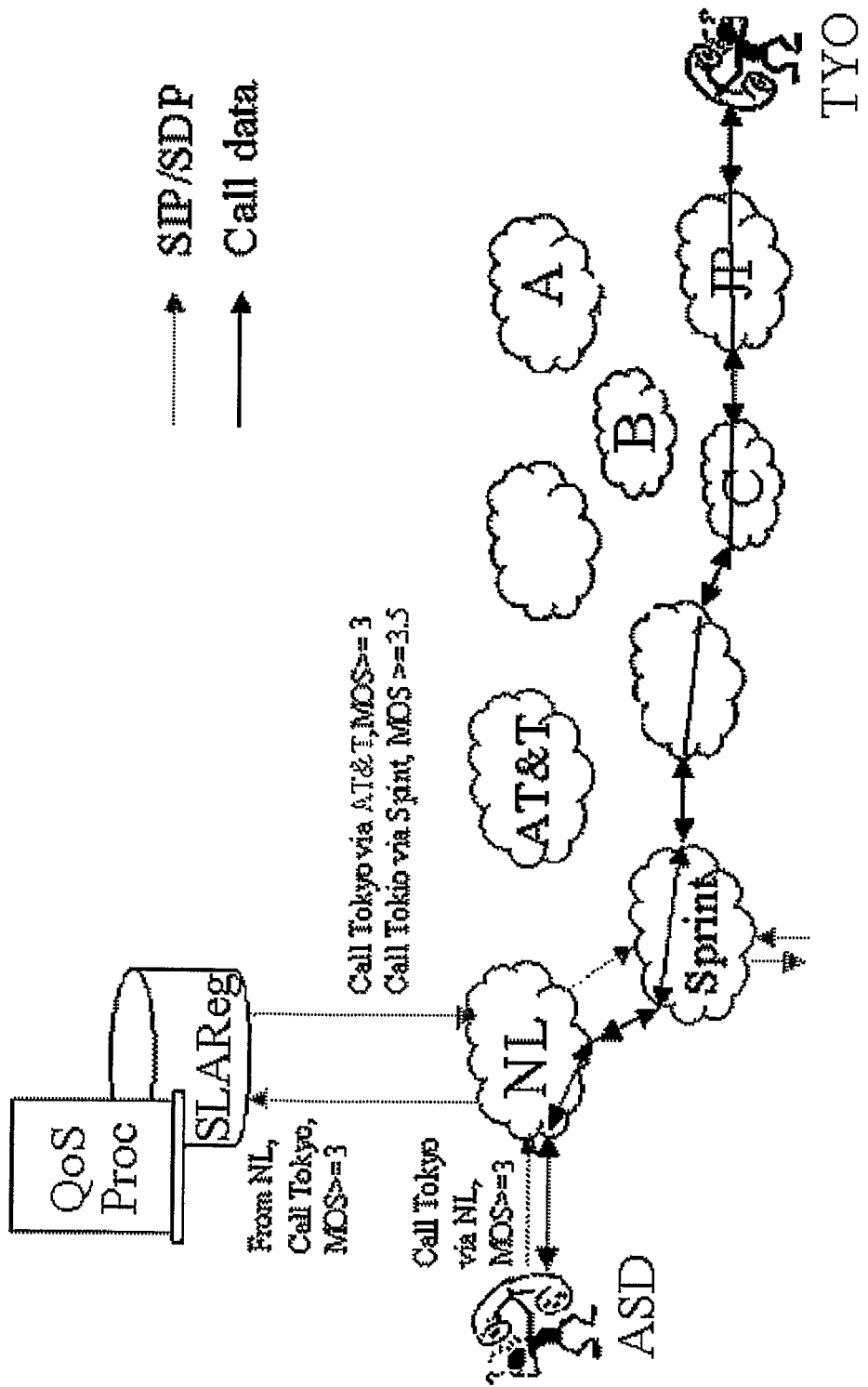
FIG. 2 shows a communication network including means for advanced setting up a network session through several domains as introduced and discussed in the previous paragraph.

The system shown in FIG. 2 is fit for processing a communication session to be set up via a communication path from an originating location ASD (Amsterdam) to a destination location TYO (Tokyo) through a communication network comprising several network domains, indicated as NL, Sprint, AT&T, A, B, C and JP. The system comprises a Service Level Agreement (SLA) registry, indicated by SLAReg, containing QoS related parameters which are representative for the QoS valid for the all domains, NL, Sprint, AT&T, A, B, C, JP and the rest between the originating location ASD and the destination location TYO. As the system has to be usable for all or at least the most relevant domains, the SLAs of all or at least the most relevant domains will have to be registered in the SLA registry.

The system shown in FIG. 2 moreover comprises a Quality-of-Service processor, indicated by QoSProc, which is configured for processing QoS related parameters to be retrieved from the SLA registry. Moreover, the QoS processor is configured for computing an end-to-end QoS predicting value which is representative for the end-to-end QoS value along the communication path between the originating location ASD and the destination location TYO.

Preferably, the QoS processor is adapted for predicting, based on parameters which are retrieved from the SLA registry, various end-to-end QoS values each being representative for one communication path between the originating location and the destination location. As an example, the predicted (expected) end-to-end QoS value $SLA_1$ along the domain path NL–AT&T– . . . –B–JP ($SLA_1 = SLA_{NL} + SAL_{AT\&T} + \ldots + SL_B + SLA_{JP}$) has a Mean Opinion Score (MOS) value—a voice related SLA parameter—of 3. When the recommended or least permissible MOS value, set by the originating party ASD is 3.5, the session may be discarded or discussed (negotiated) with the session initiator ASD.

Preferably, the QoS processor is configured for ranking or selecting or both ranking and selecting, based on at least two predicted end-to-end QoS values, one or more communication paths between the originating location and the destination location, e.g. having an optimal QoS value, e.g. a minimum MOS value of 3. In the example depicted in FIG. 2, if the domain path NL–Sprint– . . . –B–JP, has a MOS value of at least 3.5, the session preferably will be set up using that path having the highest end-to-end QoS value (MOS value in this case). However, e.g. for "local reasons", the path via the AT&T domain can be chosen (having a MOS of at least 3).

It may be clear that in a real network, comprising several domains with different SLAs, the QoS processor may generate a ranked list of a number of more and less attractive network paths, which can be chosen to effectuate a session between the originating location e.g. ASD and the destination location e.g. TYO, e.g.

| Path | MOS |
|---|---|
| I | 3.5 |
| II | 3.0 |
| III | 2.8 |
| IV | 2.1 |
| ... | ... |

As discussed before, the Quality-of-Service (QoS) processor may alternatively be configured for processing the QoS related parameters and predicting end-to-end QoS values representative for the communication paths between each network domain to each other network domain in advance (thus not necessarily initiated by a new session request). In this configuration, the QoS processor will be enabled to store the predicted end-to-end QoS values in a QoS registry which e.g. may be—as suggested in FIG. 2—incorporated in the SLA registry. As soon as a new session is requested, the QoS processor may select and/or rank, based on said predicted end-to-end QoS values stored in the QoS registry, one or more communication paths between the originating location and the destination location, e.g. having QoS values which are acceptable for the initiating and/or destination party (ASD and TYO in FIG. 2).

When the network is an IP based multimedia network like the Internet, for setting up network sessions use may be made of the SIP (Session Initiation Protocol) protocol, an IP telephony signaling protocol developed by the IETF, currently primarily used for voice over IP (VoIP) calls. The SIP can also be used for video or any media type; for example, SIP has been used to set up multi-player games. SIP is a text-based protocol that is based on HTTP and MIME, which makes it suitable and very flexible for integrated voice-data applications. SIP is designed for real-time transmission, uses fewer resources and is considerably less complex than e.g. the H.323 protocol. SIP relies on the Session Description Protocol (SDP) for session description and the Real-time Transport Protocol (RTP) for actual transport (see RTP and SDP).

When exploring the SIP, all or at least the relevant ones of the domains (viz. the relevant domain controlling means, not explicitly shown in FIG. 2) may comprise signalling means which are adapted to use extensions to the SIP signalling protocol to exchange the relevant QoS related parameters and/or QoS values and to transmit path rankings etc.

Finally, it is noted that the SLA registry and/or the QoS processor may be implemented as a distributed database resp. processor, despite the fact that both network components have been indicated by the single (and simple) modules SLAReg and QoSProc.

The invention claimed is:

1. A system for processing a communication session to be set up via a communication path from an originating location to a destination location through a communication network comprising a plurality of network domains, the system comprising:

a Service Level Agreement (SLA) registry, containing values for QoS related parameters that are representative of QoS valid for relevant domains between the originating location and the destination location, values for the QoS related parameters being representative of QoS for respective ones of relevant domains along the communication path; and a Quality-of-Service (QoS) processor which is configured to:

process QoS related parameter values, which are retrieved from the SLA registry, that are representative of QoS valid for a plurality of relevant domains between the originating location and the destination location, and predict, based on the values for QoS related parameters that are representative of QoS valid for relevant domains between the originating location and the destination location, a plurality of end-to-end QoS values, each end-to-end QoS value being representative of one communication path between the originating location and the destination location, the QoS processor being configured to rank and/or select, based on the plurality of predicted end-to-end QoS values, one or more communication paths between the originating location and the destination location.

2. The system according to claim 1, wherein the Quality-of-Service (QoS) processor is configured to:

process QoS related parameters which are retrieved from the SLA registry, and predict, based on the QoS related parameters, end-to-end QoS values representative for one or more communication paths from each network domain to each other network domain, the QoS processor being configured to store said predicted end-to-end QoS values in a QoS registry, the QoS processor, moreover, being configured to rank and/or select, based on said predicted end-to-end QoS values stored in the QoS registry, one or more communication paths between the originating location and the destination location.

3. The system according to claim 2, wherein the system is adapted to use an SIP signaling protocol to exchange QoS related parameters and/or QoS values.

4. The system according to claim 1, wherein the system is adapted to use an SIP signaling protocol to exchange QoS related parameters and/or QoS values.

5. The system according to claim 1, wherein the SLA registry is implemented as a distributed database.

6. The system according to claim 1 wherein the QoS processor further provides a recommended communication path based upon the rank of the communication paths.

7. A system for processing a communication session to be set up via a communication path from an originating location to a destination location through a communication network comprising a plurality of network domains, the system comprising:

a Service Level Agreement (SLA) registry, containing values for QoS related parameters that are representative for QoS valid for relevant domains between the originating location and the destination location, values for the QoS parameters being representative of QoS for respective ones of relevant domains along the communication path; and a Quality-of-Service (QoS) processor which is configured to:

process QoS related parameter values, which are retrieved from the SLA registry, that are representative of QoS valid for a plurality of relevant domains between the originating location and the destination location, and predict, based on the values for QoS related parameters that are representative of QoS valid for relevant domains between the originating location and the destination location, end-to-end QoS values representative of one or more communication paths from a network domain to another network domain, the QoS processor moreover being configured to store said predicted end-to-end QoS values in a QoS registry, the QoS processor being configured to rank and/or select, based on said predicted end-to-end QoS values stored in the QoS registry, one or more communication paths between the originating location and the destination location.

8. The system according to claim 7 wherein the QoS processor further provides a recommended communication path based upon the rank of the communication paths.

9. A method of processing a communication session from an originating location to a destination location through a communication network comprising a plurality of network domains, the method comprising:

providing a Service Level Agreement (SLA) registry, containing values for QoS related parameters that are representative of QoS valid at least for relevant domains between the originating location and the destination location, values for the QoS related parameters being representative of QoS for respective ones of relevant domains along the communication path;

retrieving, by a QoS processor, QoS related parameter values, from the SLA registry, that are representative of QoS valid for a plurality of relevant domains between the originating location and the destination location;

predicting, by the QoS processor based on the values for QoS related parameters that are representative of QoS valid for relevant domains between the originating location and the destination location, a plurality of end-to-end QoS values, each end-to-end QoS value being representative of one communication path between the originating location and the destination location;

ranking and/or selecting, by the QoS processor, based on the plurality of predicted end-to-end QoS values, one or more communication paths between the originating location and the destination location;

receiving, by a domain of the communication network, a request for the communication session between the originating location and the destination location; and requesting from the QoS processor, by the domain of the communication network, QoS information regarding routes through the communication network between the originating location and the destination location.

10. The method according to claim 9, further comprising setting up the communication session via a recommended communication path that is selected in said ranking and/or selecting step.

11. The method according to claim 9, further comprising setting up the communication session via a recommended communication path that is selected on the basis of a ranking produced by said ranking and/or selecting step.

12. The method according to claim 9, further comprising:

providing, by the QoS processor, a recommended communication path based upon the rank of the communication paths.

13. A method of processing a communication session from an originating location to a destination location through a communication network comprising a plurality of network domains, the method comprising:

providing a Service Level Agreement (SLA) registry, containing values for QoS related parameters that are representative of QoS valid at least for relevant domains between the originating location and the destination location, values for the QoS related parameters being representative of QoS for respective ones of relevant domains along the communication path;

retrieving, by a QoS processor, QoS related parameter values, from the SLA registry, that are representative of QoS valid for a plurality of relevant domains between the originating location and the destination location;

predicting, by the QoS processor based on the values for QoS related parameters that are representative of QoS valid for relevant domains between the originating location and the destination location, end-to-end QoS values representative of one or more communication paths from a network domain to another network domain;

storing, by the QoS processor, said predicted end-to-end QoS values in a QoS registry;

ranking and/or selecting, by the QoS processor, based on said predicted end-to-end QoS values stored in the QoS registry, one or more communication paths between the originating location and the destination location;

receiving, by a domain of the communication network, a request for the communication session between the originating location and the destination location; and requesting from the QoS processor, by the domain of the communication network, QoS information regarding routes through the communication network between the originating location and the destination location.

14. The method according to claim 13, further comprising setting up the communication session via the recommended communication path that is selected in said ranking and/or selecting step.

15. The method according to claim 13, further comprising setting up the communication session via a recommended communication path that is selected on the basis of a ranking produced by said ranking and/or selecting step.

16. The method according to claim 13, further comprising:
providing, by the QoS processor, a recommended communication path based upon the rank of the communication paths.

17. A non-transient computer program product, comprising a program of instructions, which, when executed by a Quality-of-Service (QoS) processor in a system for processing a communication session to be set up via a communication path from an originating location to a destination location through a communication network that comprises a plurality of network domains, causes the Quality-of-Service (QoS) processor to:

retrieve QoS related parameter values, from a Service Level Agreement (SLA) registry, that are representative of QoS valid for relevant domains between the originating location and the destination location;

predict a plurality of end-to-end QoS values, each end-to-end QoS value being representative of one communication path between the originating location and the destination location; and rank and/or select, based on the plurality of predicted end-to-end QoS values, one or more communication paths between the originating location and the destination location.

18. The computer program product according to claim 17 wherein the executed instructions cause the QoS processor to provide a recommended communication path based upon the rank of the communication paths.

19. A non-transient computer program product, comprising a program of instructions, which, when executed by a Quality-of-Service (QoS) processor in a system for processing a communication session to be set up via a communication path from an originating location to a destination location through a communication network that comprises a plurality of network domains, causes the Quality-of-Service (QoS) processor to:

retrieve QoS related parameter values, from a Service Level Agreement (SLA) registry, that are representative of QoS valid for relevant domains between the originating location and the destination location;

predict, for a plurality of network domains, end-to-end QoS values representative for one or more communication paths from ones of the plurality of network domains to other ones of the network domains;

store said predicted end-to-end QoS values in a QoS registry; and rank and/or select, based on said predicted end-to-end QoS values stored in the QoS registry, one or more communication paths between the originating location and the destination location.

20. The computer program product according to claim 19 wherein the executed instructions cause the QoS processor to provide a recommended communication path based upon the rank of the communication paths.

* * * * *